Sept. 24, 1946.  A. L. FOSTER  2,408,164
CATALYST PREPARATION
Filed April 25, 1942  2 Sheets-Sheet 1
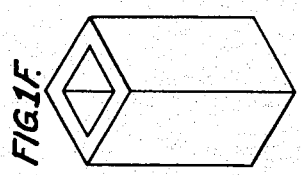
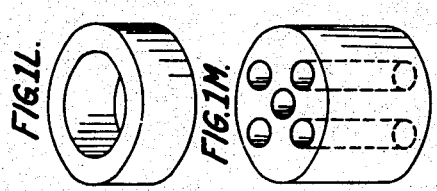
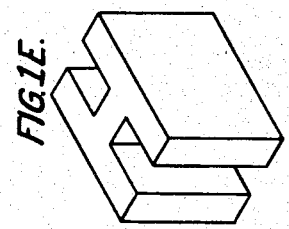
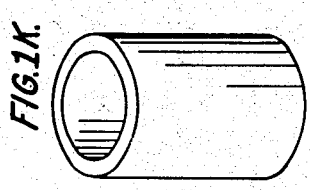
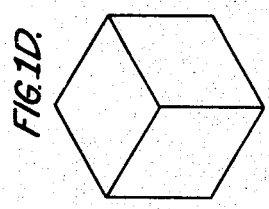
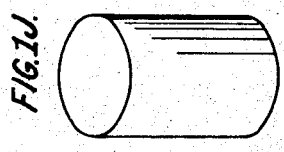
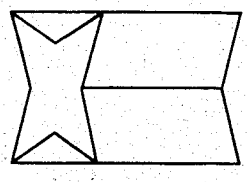
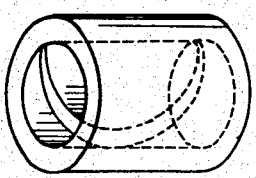
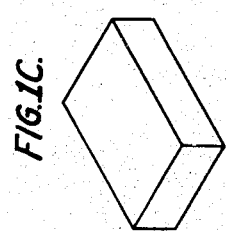
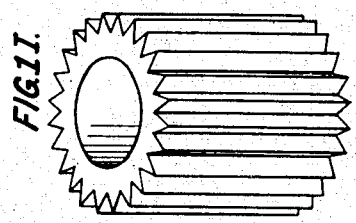
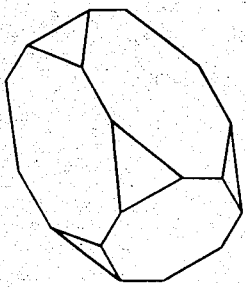
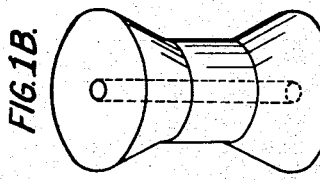
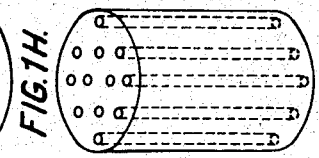
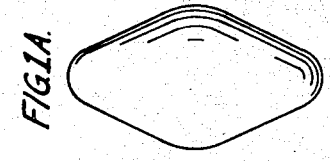
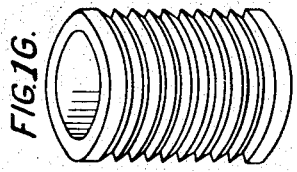
INVENTOR
ARCH L. FOSTER
BY *Hudson, Young & Yinger*
ATTORNEYS Sept. 24, 1946.　　　A. L. FOSTER　　　2,408,164
CATALYST PREPARATION
Filed April 25, 1942　　　2 Sheets-Sheet 2

INVENTOR
ARCH L. FOSTER
ATTORNEYS

Patented Sept. 24, 1946

2,408,164

UNITED STATES PATENT OFFICE 2,408,164

CATALYST PREPARATION

Arch L. Foster, Bartlesville, Okla., assignor to Phillips Petroleum Company, a corporation of Delaware Application April 25, 1942, Serial No. 440,561

3 Claims. (Cl. 252—259.2)

This invention relates broadly to the preparation of catalytic materials and more specifically to the shaping of materials possessing catalytic activity into suitable forms to render them more efficient for use in the various purposes to which they are applied. The invention relates more particularly to the preparation of catalytic masses of compounds which possess the property of cohering in rigid, self-supporting units under conditions hereinafter specified, the form of the units permitting the catalyst and catalyzed material to come into closer and more effective contact during reaction.

In the entire history of catalysis one of the major problems has been that of bringing the catalyst into intimate, effective contact with the charge material to be catalyzed and of maintaining its surface so that this intimate contact may be continued for a satisfactorily long period of time. The longer a catalyst can be maintained with a free, active surface for contact with the charge material the longer operation may continue without time-consuming revivification steps being necessary and the more efficient is the operation. According to one theory widely accepted (see "Catalysis," by Berkman, Morrell and Egloff), catalysis is a surface phenomenon. Catalytic activity is believed to be due to unsaturated or unsatisfied valence forces in atoms, by virtue of their position with respect to other atoms in the material. These forces are believed to be smallest within the body of the material, greater near and at the surfaces where these forces are unbalanced, and greatest on the edges and at points. A material amorphous in physical make-up is believed to be more active catalytically than if used in crystalline form, since in crystals secondary forces or valences are considered to be directed toward the crystal's center, whereas in amorphous bodies these valences are directed toward the outside of the unit of material. Therefore it is necessary that there be maintained the largest practicable surface area which may be brought into contact with the material to be catalyzed. In the case of a liquid or vapor catalyst, the surface contact area approaches the infinite, and is limited theoretically only by the number of molecules in the catalyst. When dealing with a solid catalyst, therefore, it is desirable to use it in a form which presents the greatest practicable surface area, so that the greatest proportion of the catalyst in the reaction zone actually takes part in catalyzing the reaction and the highest catalyst efficiency is obtained.

Furthermore, the method of handling and applying the catalyst to any given purpose is dictated by the physical condition of the catalyst and the requirements of the purpose. The more finely divided a catalyst mass is, the greater the contact area presented. Therefore, where practicable a catalyst in a very finely comminuted state is employed. Finely pulverized catalysts may be employed advantageously where the stock is allowed to percolate upwardly or downwardly through a bed of fine catalyst whereby very intimate contact is obtained. However, this mode of operation is frequently subject to the disadvantages that "channeling" takes place and that a portion of the bed is washed away in the treated effluent stream. Also the pressure drop through a mass of the catalyst is excessive.

Alternatively, finely divided catalyst may be mixed with a liquid, either the liquid being treated or an auxiliary slurry-forming liquid, and the resulting suspension or slurry pumped through a reaction zone where it is exposed to the conditions adjudged best for carrying out the reaction. This operating system is commonly designated the "fluid catalyst" method. However, this method of handling the catalyst requires either that the catalyst be settled out to separate it from the reaction mixture and the charge stock or the residue from the reaction, or that the entire liquid material in whatever condition it may exist be vaporized or filtered off from the catalyst, or that other special means be employed to remove the treated liquid from the catalyst which may then be reused, regenerated or discarded as desired.

Charge stocks in vapor form may also be brought into contact with a finely divided catalyst, although again in many cases channeling of the through-passing vapors occurs with inefficient results.

Another difficulty is that handling the spent finely divided catalyst calls for special methods and equipment for its rejuvenation since generally it is not practicable to regenerate a powdered catalyst in situ.

Another method of preparing catalysts heretofore employed is that of pressing, extruding or otherwise forcing a granular or powdered catalyst material into various shapes under certain conditions in an endeavor to insure the material retaining the resulting shape during reaction, and regeneration or revivification. These forms may be rods, cylinders, spheres, spools, etc. of various shapes, sizes, dimensions and proportions. The main purposes of this procedure are four: (1) to permit easy handling; (2) to increase the contact surface of a given amount of catalyst; (3) to improve the passage of liquid or vapor through the catalyst while increasing the length of time between regenerations; and (4) in the case of relatively volatile catalyst, such as metal halides, to prevent or minimize catalyst losses by volatilization. However, the resulting shapes do not have adequate strength, rigidity, crushing resistance, resistance to abrasion upon handling, and resistance to thermal shock upon being used in conversion and during regeneration.

In hydrocarbon conversions at elevated temperatures over solid catalysts, one always-present result is the deposition of carbon on the surface of the catalyst. This carbonaceous coating soon blankets the surface of the catalyst, necessitating removal of the coating before the catalyst can continue to promote the reaction. In some commercial operations now well-known to the industry the active life of the catalyst is only three to ten minutes "on-stream" after which the carbon is removed by burning, to reactivate the mass and permit efficient operation of the process. The extra equipment required for this revivification operation and the time lost from productive operation during the regeneration part of the cycle adds greatly to the cost of the operation. The provision of catalyst in forms which permit easier and quicker removal of waste and deleterious material formed during the reaction cycle is a distinct advantage in any catalytic process. One main object of this invention, therefore, is to provide a form of catalyst from which extraneous matter may be removed by combustion, by solvents or by other means with the maximum of ease, simplicity and at a minimum cost in time and money.

Another problem faced by the operator of a catalytic unit is that of placing the catalyst in the reaction chamber in such manner that all portions of the catalyst are brought into contact with the reaction materials in the same degree. If the form and condition of the catalyst mass, or units of which that mass is composed, are such that the catalyst can "pack" together at irregular intervals, presenting little space for passage of liquid or vapor, the result is that the charge channels in passing through, overworking part of the catalyst while the remainder, in the closely packed sections, remains out of contact with the charge, resulting in inefficient, expensive operation. Another object of this invention, therefore, is to provide a catalyst form which prevents or minimizes channeling and brings all parts of the catalyst into comparatively equal contact with the charge stock.

In the use of volatile catalysts such as metal chlorides, for example, aluminum, ferric, stannic, stannous, and titanium chlorides, the inevitable result of reactions carried out at moderately elevated temperatures is a continuous loss of catalyst by volatilization with a gradual choking of vapor and condenser lines and contamination of the product with the condensed catalyst. An additional object of the present invention is to prevent volatilization of solid or liquid catalysts, the vaporization points of which lie in or near the temperature range of the reaction, by preparing such catalysts in solid briquette-type forms in a special manner.

One characteristic of some metal halide catalysts used to promote hydrocarbon reactions is that, as reaction continues, a tarry, unctuous mass forms on the surface, effectually blanketing the catalyst and preventing it from exercising its effect on the reaction. If the charge stock flows over a properly formed catalyst as a liquid or film or if the reaction products formed are liquid at the operating temperature, the flow of this liquid will tend to remove this tarry material as fast as it is formed, preventing the blanketing effect so detrimental to efficient catalyst activity. Or, if only vapors are present in contact with the catalyst, the presence of uniform spaces for the passage of reflux or other liquid over and around the catalyst pieces facilitates removal of this tarry blanket by means of solvents or other means which may be employed. Still another object of this invention is to facilitate removal of undesirable side-reaction products or foreign matter from the catalyst.

Porosity is an extremely important characteristic in a catalyst. The more highly porous a catalyst mass the greater the ratio of contact surface to weight or volume of catalyst, and the more efficient the catalyst per unit of mass. Some materials are obtainable in crystalline form, or in other form which maintains interstices throughout the mass through which fluids may pass and thus come into contact more intimately with a greater catalyst surface. Other materials are more amorphous in physical form or crystallize in such form as to make an essentially impervious mass of the catalyst in bulk. Preparation of a solid catalyst, in pellet form, for example, in such manner that the pellet is composed of an aggregation of either porous or non-porous particles of irregular shape with interstices between, and without the use of a compressive or other force strong enough to crush the individual particles results in a pellet having high porosity and comparatively high compressive strength. Such a catalyst is far more efficient than a pelleted catalyst of either crystalline or amorphous material in a finely divided state which presents only the outer surface of the individual pellet, or the outer surface plus microscopic or submicroscopic pores as contact area. An object of this invention is to prepare such a highly efficient and comparatively rugged type of catalyst.

Numerous other objects will be obvious from the description given herein.

In the accompanying drawings:

Fig. 1 illustrates typical catalyst shapes into which the catalyst may be formed by the process of the invention.

Figure 2:
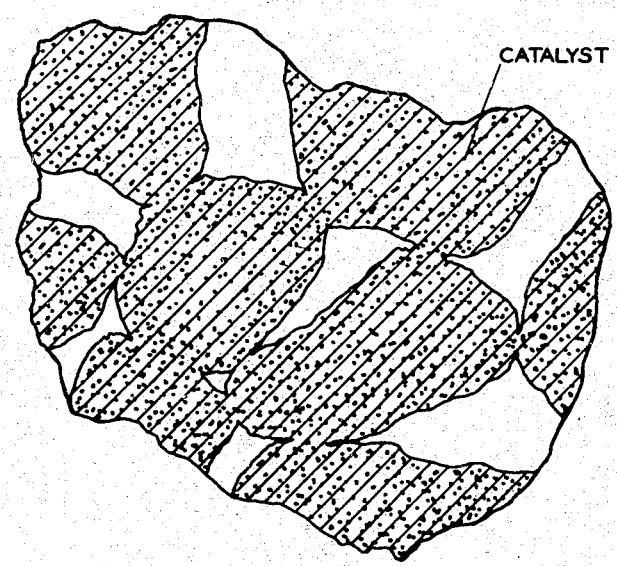
Fig. 2 is a macroscopic fragmentary section of a catalyst shape prepared by the invention.

In accordance with my invention, in one aspect, a mass of catalyst particles is shaped by exerting mechanical pressure thereupon while the particles are heated to a temperature such as to cause bonding of the particles at the points of contact under the pressure exerted. This causes bonding of the particles by welding or fusion at the points of contact and prevents filling, obstruction, or destruction of the voids between the catalyst particles. Upon cooling and/or releasing the pressure, preferably substantially simultaneously, a rigid catalyst body is obtained which may advantageously be used in packing a catalyst tower. The resulting body retains substantially the porosity of the original granular or powdered mass because the original voids between contiguous particles or granules are maintained and additionally because the conditions of temperature during forming are preferably such as to prevent superficial fusion or glazing of the surface other than at the edges, points, or areas in contact. This is attained by the use of mechanical pressure such that it is possible to effect fusion at the points of contact at a temperature substantially below that at which actual melting at atmospheric pressure or under the mere static pressure of the mass due to the force of gravity or on the non-touching areas, takes place.

Thus my invention takes advantage of the phenomenon whereby, upon pressing together two solid surfaces into contact with one another at elevated temperature, bonding is effected below the normal melting of said solid at atmospheric pressure. Accordingly the foregoing objects are attained in a simple and economical manner.

The temperature, pressure, and time of subjection to the particular temperature and pressure employed should be so correlated that the product obtained is strong, rigid, and highly resistant to crushing or powdering during handling and use and yet not materially reduced in porosity (either in inter-particle voids or in superficial porosity of each particle or granule) as compared to a pellet made by simple compression at ordinary temperature.

My process may be carried out by pelleting the granular or powdered, crystalline or amorphous solid catalytic material, as in a pelleting machine, at sufficiently elevated pressure and temperature to cause incipient fusing of the catalyst particles and thereby effect welding or bonding but insufficient to destroy or materially change the granular, crystalline or other structure of the particles and insufficient to cause substantial reduction in porosity. Thus the individual particles are coalesced into homogeneous rigid forms in which the original structure and size of the particles is essentially unchanged.

If the pressure is sufficiently high, the temperature employed may be far below the normal melting temperature of the catalyst.

Frequenly the conditions of treatment are such that no detectable fusion takes place. Nevertheless there is formed an extremely strong and intimate bond in which there is no line of contact, even though incipient fusion may not actually have taken place.

The mechanical pressure exerted serves to cause bonding of the particles at their points and areas of contact without subjecting the rest of the particle, i. e., the main body of the catalyst, to an increased pressure over that prevailing in the gaseous atmosphere of the network of voids, which will usually be substantially atmospheric. Thus fusion takes place at most at the contact point without glazing of the main area of the catalyst particles.

The mechanical pressure employed may range from one additional atmosphere, i. e., 15 lbs. per sq. in., upwardly. Preferably pressures of at least 100 lbs. per sq. in. are employed. Pressures ranging as high as 10,000 lbs. per sq. in. may be used. The pressure will depend upon the particular catalyst being treated. It should be sufficient under the conditions of time and temperature employed to cause the bonding described above but insufficient to cause crushing of the individual particle or granule. Thus, for less hard catalysts such as aluminum chloride, very low pressures will ordinarily be used, but for hard rigid materials, such as those containing a large percentage of silica, extremely high pressures may be used.

The principles of this invention are applicable to any type of solid material which may be employed for catalytic purposes and which possesses the property upon heating under mechanical pressure of joining, welding or bonding at a temperature substantially below its normal melting temperature. Thus it may be applied to any solid material or mixture of materials used in catalysis. In the case of liquid catalysts such as titanium tetrachloride or stannic chloride the liquid may be sprayed, filmed or coated on a solid catalytic material or on an inert carrier material and the impregnated mass may be formed into any desired shapes in the same manner that the solid material is formed.

Any single material or compound or any mixture of solid materials may be shaped in accordance with my invention. For example, silica and alumina may be precipitated separately from solutions of suitable salts and then mixed mechanically, but preferably mixed solutions are precipitated together, washed and dried to any desired degree and then formed in accordance with the invention. Solids which are not obtainable thoroughly admixed with other solids may be so mixed by mechanical means by adding the two or more materials in crystal or amorphous form to a ball mill, rod mill, or other pulverizing unit in case it is desired to grind the materials to finer comminution or to a container equipped with paddles, stirrers, or a muller, or other apparatus for mixing pulverized solids and the operation continued until the desired intimacy of mixing is attained, after which the mass may be formed into any desired shape of catalyst units in accordance with the invention.

Illustrative forms into which catalysts may be shaped are shown in Fig. 1 of the accompanying drawings. Many other forms and shapes may be employed, the prime prerequisite being that as far as practicable the catalyst pellets be so shaped that they will not pack in the tower or tray or other support so as to permit channeling of the fluid passing through the bed, and so that "bridging" of passageways by undesirable by-products occurs to a minimum degree. The ideal catalyst pellet is one which exposes a maximum surface to contact per unit of catalyst weight or volume, and one which cannot be packed in such a way as to cause channeling. The various proposed forms are designed to promote the efficiency of the catalyst in these two factors especially, and the choice of any given form or combination of forms is determined by the conditions to be met in the use of the catalyst.

Instead of relatively small shapes such as pellets, I may prepare massive shapes such as saddles, rings, discs, plates, etc. Use of regular geometrical shapes minimizes packing in a catalyst chamber and results in low pressure drop through a catalyst bed.

Methods of preparation of catalysts in accordance with this invention will be determined by the nature of the catalyst, its physical and chemical properties, and by the requirements of the finished product. For the purpose of outlining the invention, catalysts may be divided into two general classes: (1) catalysts which are fusible, wholly or partially at moderately elevated temperatures not excessively above those to be employed in fashioning the pellet and (2) those which are relatively infusible except at temperatures much higher than those normally considered economical.

Typical of the fusible class of catalysts are the metal chlorides, the so-called Friedel-Crafts catalysts. At elevated temperatures, especially in the vicinity of their melting points, or even at temperatures considerably lower than their melting points but well above atmospheric temperatures I have found that these materials possess the inherent property, varying in degree with different compounds, of coalescing sufficiently at moderately elevated temperature and preferably under moderate pressure to from rigid bodies or forms which may be used as such with resultant greater ease in handling and greater efficiency in use as catalysts. Incipient melting, or a softening of the outer edges or surfaces of crystals or of amorphous bodies of the catalyst appears in practice to yield a condition of the material which acts as a binding medium to agglomerate the particles into a rigid mass which may be handled as a unit and which will retain its form at any temperature below the melting point of the original material and will not be substantially abraded or worn away by ordinary careful handling under the mechanical conditions ordinarily applied to solid catalysts. Physical attrition of the catalyst form or removal of it by vaporization or melting occurs at the surfaces and edges and is minimized by the compact rigid form employed. The tendency is to retain the general unit form during this attrition process, so that the catalyst remains approximately in such unit form throughout its life.

A general principle of pelleting these catalysts, therefore, is to place the material in crystal, amorphous, granular or ground form under high pressure and at elevated temperature in a molding or shaping machine where it is forced into the shape desired, to form a pellet or unit of the required rigidity and physical ruggedness for the purpose. A large variety of shaping and pelleting machines is well-known to the art, and the specific means and equipment for carrying out this purpose is not a part of this invention. The temperature and pressure employed are determined by the nature of the catalytic material and the ruggedness required in the finished product. Generally the nearer the temperature to the melting point of the material the shorter is the time and the lower the pressure required to form a suitable product. Also, the nearer the temperature employed to the melting point the more compact, less porous the resulting pellet is and the less the effective contact area of the catalyst is, especially when charge stocks are treated in liquid form where penetration into the small, macroscopic interstices of the mass increases materially the effective contact area. Conditions of preparation of the catalyst mass are therefore a compromise between compactness and ruggedness, on the one hand, and catalyst efficiency and the largest practicable contact area, on the other. Wide variations in catalyst ruggedness and porosity may be obtained, and the determination of conditions of preparation will be made in the light of the requirements for the finished catalyst.

In the following table are given the melting and the boiling points of the metal halides most widely used as catalysts in hydrocarbon catalysis.

| Compound | Boiling point | Melting point |
| --- | --- | --- |
| | °F. | °F. |
| Aluminum chloride, AlCl₃ | 361 | ¹374 |
| Aluminum bromide, AlBr₃ | 505 | 207.5 |
| Ferric chloride, FeCl₃ | 599 | 540 |
| Aluminum iodide, AlI₃ | 680 | 376 |
| Zirconium chloride, ZrCl₄ | 572 | ²572 |
| Stannic chloride, SnCl₄ | 237 | −27 |
| Titanium chloride, TiCl₄ | 277 | −22 |
| Zinc chloride, ZnCl₂ | 1,350 | 504 |

¹ 2.5 atmospheres pressure.
² Sublimes.

Frequently it is desirable to include larger or smaller percentages of other catalytic or relatively inert materials with the primary catalyst to be pelleted. The addition agents may be for the purpose of improving the bond which holds the finely divided catalyst material together, it may be for the purpose of absorbing side-reaction products selectively or to absorb foreign matter in the charge stock or reaction fluids, matter such as water vapor or liquid, tars, sulfur or other contaminants present or for any other purpose, such as a catalyst promoter or an inhibitor of undesirable side reactions. In this case the auxiliary material may be pulverized to any desired degree, which may or may not be the same as the state of subdivision of the main catalyst, the two pulverulent materials are intimately mixed mechanically, and the mass subjected to the desired temperature and pressure conditions to produce the finished pellet. The temperature-pressure conditions are regulated in view of the physical characteristics of the two materials as they are when only one material is being treated. The primary and essential requirement is that the compressed and heated mass form a satisfactory pellet for the conditions under which it is to be used, and temperature and pressure are controlled to further that end. Frequently, in fact generally, a mixture of materials especially in crystalline form melts at temperatures lower than the melting point of either material, in which case control of the temperature must be careful and exact and the time of heating must be carefully controlled in order to avoid going further than the mere incipient melting which by trial and error is determined as the best condition for forming the catalyst mass of the characteristics desired. These conditions will vary for each combination of two or more materials, and for each combination of percentages of each in the mixture. For these reasons a comprehensive presentation of temperatures, pressures and lengths of time for heating cannot be given. However, the selection of suitable operating conditions for the carrying out of the invention will be obvious to those skilled in the art in the light of this description.

When properly mixed, if using two or more materials, or when satisfactorily pulverized, the catalytic material may be introduced into a heater, preferably on a moving conveyor such as a belt or buckets, and heated for the required time at the desired maximum temperature, being exposed to the temperature for a predetermined time to effect the required degree of softening or incipient melting. This heater may be a narrow, enclosed space heated externally by any convenient means or the material in its container or conveyor may pass through a stream of hot gases, such as flue gas low in oxygen content, to raise it to the desired temperature. Generally rapid heating by gases or an oven at a temperature well above that desired in the catalyst is preferable since by so doing the edges of crystals or of irregular small particles will be heated above the average temperature of the mass to provide the desired bonding condition of the surfaces. When the material has reached the required condition it is immediately transferred to the molds or dies, care being taken that it does not lose any appreciable temperature in the process, and is immediately subjected to pressure sufficient to form a pellet of the desired rigidity, density and mechanical strength. Methods and equipment for forming pellets of any desired shape and size are old in the art and form no part of this invention. Pressures may vary widely, the value depending on the materials processed, temperatures employed and the requirements for the finished pellet.

A preferred way of operating is to subject the mass of powdered or granular, crystalline or amorphous catalyst simultaneously to heat and pressure, each of the requisite degree for the period of time necessary to effect fusion, welding and bonding at the points, edges or areas of contact only and without substantial reduction in volume of voids between the particles. This operation may be carried out in any suitable apparatus. Where relatively small shapes are desired, the process may be effected in a pelleting machine provided with means for bringing the catalyst to the required temperature, for holding it there during the compression or shaping under pressure and for cooling the resulting shapes and releasing the pressure. Preferably cooling and release of pressure take place simultaneously. If desired the cooling may be effected by releasing or ejecting the pellets through a cooling zone where they are cooled by a cooling fluid. In many cases mere ejection of the pellets into the atmosphere effects simultaneous cooling and release of pressure sufficiently to cause the pellets to retain their shape upon handling, upon packing into a bed, and during conversion therewith.

In the case of larger forms, the selection of suitable apparatus will be within the skill of workers in the art in the light of the foregoing.

The size of the particles or granules of catalyst material treated in accordance with my invention may vary widely, from say 200 mesh up to several inches in average diameter. It is preferred to use initial material so graded in accordance with known principles as to give substantial interparticle voids i. e. at least 20% by volume of voids. Frequently particles of substantially the same size will be most desirable.

In the case of highly volatile hygroscopic metal halide catalysts, especially aluminum chloride, it is frequently desirable to blend therewith a minor percentage of another metal halide which is not primarily catalytic, for example alkaline earth chlorides, for example calcium chloride or magnesium chloride. This material acts to raise the melting point and lower the vapor pressure of the aluminum chloride and also acts to remove any traces of water therefrom.

The examples given below are illustrative only, and this invention is in no wise to be limited by these examples which merely illustrate without limiting the principle of the process. Care must be taken to avoid too much melting, particularly with metal halide catalysts, and thus obtaining a sintered mass if held under pressure, or of volatilizing too large quantities of the material at atmospheric pressure. As stated above, melting must be at most incipient, barely enough to form a bond which, under the pressure of the forming die, cements the particles together without closing the macroscopic openings or destroying the porous structure of the catalyst.

The surfaces of the mold may be advantageously roughened or corrugated to increase the surface of the pellet or shape. As shown in Fig. 1, the pellets may be of almost any form, such as cylindrical with large ratio of inner diameter to outer diameter. The cylinders may have a multiplicity of longitudinal holes therethrough to increase contact surface.

Example 1

Two hundred (200) pounds of anhydrous aluminum chloride and 10 pounds of calcium chloride are crushed between corrugated rolls until 90 per cent will pass a 16-mesh screen and are then passed through an oven via conveyor belt, heated by radiation to 325° F. for 20 seconds and passed into a jacketed hopper maintained at 300–325° F., from which it is measured automatically into dies in a plunger press and subjected to a pressure of 25 to 100 pounds per square inch. The resultant pellets, which may be in the form of perforated cylinders ½ inch long by ⅜-inch diameter are dumped on an asbestos-fiber coated belt and allowed to cool while passing through a tunnel in a breeze of cold flue gas. The formed pellets will retain their shape with only slight shattering of edges when dumped repeatedly on a mass of the same pellets from a height of three feet at atmospheric temperature.

Example 2

Two hundred fifty (250) pounds of anhydrous zirconium chloride, $ZrCl_4$, and 20 pounds of 16–30 mesh alumina, $Al_2O_3$, are mixed intimately in a revolving tumbler drum, and heated by hot flue gas to 540–550° F. for about 30 seconds and then pelleted in a "rounded diamond" die press at essentially the same temperature and at 50–100 pounds per square inch. After cooling to atmospheric temperature these briquettes, $\frac{7}{16}$-inch by ⅜-inch, withstood eight cycles of loading in a reaction chamber, reaction period, removal from chamber and regeneration, with very little attrition loss.

Somewhat different conditions obtain when pelleting metal oxides, sulfides and salts with considerably higher melting points. Table 2 shows the melting points of various metal oxides, sulfides and salts frequently employed as catalysts in different processes involving hydrocarbon reactions.

Table 2

Melting points of metal oxides, sulfides, and salts used as catalysts:

| Compound | Melting point |
|---|---|
| | ° F. |
| Alumina, $Al_2O_3$ | 4,082 |
| Aluminum sulfide, $Al_2S_3$ | 2,012 |
| Calcium chloride, $CaCl_2$ | 1,422 |
| Cesium chloride, $CsCl$ | 1,195 |
| Cesium nitrate, $CsNO_3$ | 777 |
| Chromium oxide, $Cr_2O_3$ | 3,614 |
| Chromium trioxide, $CrO_3$ | 385 |
| Cobaltic oxide, $Co_2O_3$ | 1,643 (d.) |
| Cupric oxide, $CuO$ | 1,879 (d.) |
| Iron oxide, $Fe_2O_3$ | 2,849 |
| Lead bromide, $PbBr_2$ | [1] 703 |
| Lead oxide, $PbO$ | 1,630 |
| Lithium chloride, $LiCl$ | 1,153 |
| Magnesium chloride, $MgCl_2$ | 1,306 |
| Manganese sulfate, $MnSO_4$ | 1,292 |
| Mercuric chloride, $HgCl_2$ | 529 |
| Molybdenum trioxide, $MoO_3$ | 1,463 |
| Nickelous oxide, $NiO$ | 3,794 |
| Phosphorus pentoxide, $P_2O_5$ | 1,045 |
| Phosphorus pentasulfide, $P_2S_5$ | 529 |
| Silicon dioxide, $SiO_2$ | 3,110 |
| Strontium chloride, $SrCl_2$ | 1,603 |
| Strontium nitrate, $Sr(NO_3)_2$ | 1,058 |
| Thorium oxide, $ThO_2$ | 5,072 |
| Tungsten trioxide, $WO_3$ | 2,683 |
| Vanadium tetraoxide, $VO_2$ | 3,573 |
| Zinc oxide, $ZnO$ | 3,272 |
| Zirconium oxide, $ZrO_2$ | 5,400 |

[1] 1,681° F., B. P.

When the incipient melting point of the catalyst in, for example, a finely or coarsely pulverized state is higher than the temperature to which it is practicable to heat the material, it becomes desirable to employ another or binding material of lower melting point, admixed with the primary catalytic material, to obtain the advantages of porous structure, strength and easy and convenient handling sought in this invention. The binder material may be catalytically inert or preferably may have a promoter or activator effect on the primary catalyst. Many metal oxides, such as silica, alumina, chromic oxide, etc., may be precipitated from solutions of their salts, washed and dried and may be used as such in pulverized or lump form as effective catalysts, the degree of subdivision being determined by the conditions of drying, or by the particle size obtained by crushing, grinding, etc. after the drying.

More frequently, however, solid catalysts so prepared and used in accordance with prior practice possess the disadvantage of small surface per unit of weight or volume, if the catalyst is retained in relatively large lumps or masses, or that of too close packing and too high resistance to the flow of fluids therethrough when employed in a state of fine pulverization. In the case of formation of tarry deposits on the catalyst, the finely divided mass may become entirely impervious to the passage of fluids in a relatively short reaction period, necessitating frequent regeneration with consequent time loss and unit efficiency reduction. If such catalysts are made into paste form and in this condition rolled, pressed or extruded to desired shapes, the drying of the formed paste may have the effect of forming a binder effect tending to retain the desired shape. This method has the disadvantage of destroying in large measure the macroscopic or microscopic porous condition in which otherwise the catalyst may be found, resulting in a considerable decrease in catalyst efficiency.

These disadvantages are largely eliminated or minimized by following the principles of this invention. A metal hydroxide, such as alumina, silica, chromic oxide or similar material may be precipitated from solution by any of the methods well known in the art. A mixture of two or more such catalytic materials may be precipitated in intimate mixture, and the mixture filtered off, dried and pulverized by any satisfactory means. Or, a mixture of hydroxides, oxides or of sulfides may be precipitated in intimate mixture, one component being of high melting point and the other of relatively low melting point. The mixed precipitates may be washed and dried in the conventional manner and pulverized to any desired degree of fineness in a suitable mill or grinder. The degree of fineness of the particles is dictated by the conditions under which the catalyst is to be employed, especially by the nature of the undesirable by-products which are formed during reaction.

In the case of a single catalytic product of low melting point, such as cesium nitrate, lead bromide, phosphorus pentoxide, or molybdenum trioxide, etc., the material may be exposed to a temperature approaching its melting point long enough to produce the required incipient fusing, and then while at said temperature formed into pellets of the desired shape in a die maintained at the required temperature for forming a satisfactory product. When pelleting the higher-melting materials such as chromic oxide, alumina, iron oxide or thoria, it is desirable to include therewith a relatively small percentage of a lower-melting material which may also have some catalytic effect, as lead oxide, manganese sulfate, or molybdic oxide, to give a mixture which reaches its incipient fusing point at a lower temperature. This lower-melting material may be added in small quantity by saturating the metal oxide or other material with a saturated solution of the material, the excess solution allowed to drain off and the mass dried and heated to incipient fusion, followed by pelleting by any acceptable process. Or, the two solid materials may be mixed intimately by mechanical means and the operation continued as with the dry mixture referred to above. Generally such a mixture of materials shows a melting point considerably below that exhibited by either product alone, and the lower temperature of heating required to produce the desired state makes for a less expensive operation. The following examples illustrate the principle without limiting in any way its application.

EXAMPLE 3

Five hundred (500) pounds of unsintered, black chromic oxide is crushed to pass a 12–20 mesh screen and mixed with five per cent of finely ground molybdic oxide and the mixture heated while passing slowly through a muffle furnace to 1000–1200° F., the mix being maintained at the maximum temperature for a period not exceeding about 15 seconds. Without cooling the mixture appreciably, it is measured into a die press, the dies being heated to 800–1000° F., and subjected to a pressure of 100 pounds per square inch for a period of ten seconds. The pellets, cylinders of corrugated outer wall ½-inch outer and ¼-inch inner diameter, are cooled to room temperature on an asbestos-surfaced belt while passing through a tunnel in a blast of cooled arid flue gas and are stored in closed bins until ready for use.

EXAMPLE 4

Granulated nickelous oxide is covered with a saturated aqueous solution of cesium chloride, the excess solution allowed to drain off and the mass dried at 250° F. The impregnated oxide is heated in a neutral atmosphere to as high as 1000° F. average temperature by direct radiation of heat on the surface of the granulated mass, maintained in a thin bed ½-inch thick, for 10–20 seconds. The mass is measured into a heated die press and formed into perforated cylinders under a pressure of 100 pounds per square inch during a period of approximately 10 seconds, is cooled in a dry neutral atmosphere and stored in the same atmosphere until ready for use.

I claim:

1. A process of forming a substantially rugged and pervious mass of a solid catalytic material comprising a normally solid Friedel-Crafts metal halide catalyst, which comprises heating a particulate mixture comprising solid particles of such a metal halide, and containing at least 20% by volume of inter-particle voids, to a temperature below the melting point of the components of said mixture and, while the particles are maintained at such temperature, subjecting said mixture to a mechanical pressure just sufficient to effect incipient fusing of said particles at their points of contact without substantial melting or disintegration of said particles and without substantial reduction in volume of voids between the particles.

2. A process of forming a substantially rugged and pervious mass of a solid catalytic material comprising solid aluminum chloride, which comprises heating a particulate mixture comprising solid particles of aluminum chloride, and containing at least 20% by volume of inter-particle voids, to a temperature below the melting point of aluminum chloride and, while the particles are maintained at such temperature, subjecting said mixture to a mechanical pressure just sufficient to effect incipient fusing of said particles at their points of contact without substantial melting or disintegration of said particles and without substantial reduction in volume of voids between the particles.

3. A process of forming a substantially rugged and pervious mass of formed catalyst particles consisting of a mixture of aluminum chloride and calcium chloride, which comprises heating a mixture of solid particles of aluminum chloride and of calcium chloride, and containing at least 20% by volume of inter-particle voids, to a temperature below the melting point and within the range of approximately 300° to approximately 325° F. and, while the particles are maintained at such temperature, molding a mass of the particles under a mechanical pressure within the range of approximately 25 to approximately 100 pounds per square inch to effect bonding of the particles only at the points of contact thereof without substantial disintegration of the particles and without substantial reduction in volume of voids between the particles.

ARCH L. FOSTER.